(12) United States Patent
Lim et al.

(10) Patent No.: US 9,380,495 B2
(45) Date of Patent: Jun. 28, 2016

(54) METHOD FOR DATA OFFLOADING IN WIRELESS COMMUNICATION SYSTEM, AND DEVICE FOR SAME

(71) Applicant: LG ELECTRONICS INC., Seoul (KR)

(72) Inventors: Jaewon Lim, Anyang-si (KR); Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 14/361,274

(22) PCT Filed: Dec. 11, 2012

(86) PCT No.: PCT/KR2012/010757
§ 371 (c)(1),
(2) Date: May 28, 2014

(87) PCT Pub. No.: WO2013/089414
PCT Pub. Date: Jun. 20, 2013

(65) Prior Publication Data
US 2014/0334446 A1 Nov. 13, 2014

Related U.S. Application Data

(60) Provisional application No. 61/570,267, filed on Dec. 13, 2011.

(51) Int. Cl.
*H04W 24/00* (2009.01)
*H04W 4/00* (2009.01)
(Continued)

(52) U.S. Cl.
CPC .............. *H04W 28/08* (2013.01); *H04W 48/20* (2013.01); *H04W 84/12* (2013.01); *H04W 88/08* (2013.01)

(58) Field of Classification Search
CPC ..... H04W 28/08; H04W 48/20; H04W 48/18; H04W 28/0205; H04W 76/026; H04L 29/06

USPC ................... 370/328–332, 395.21, 352–356, 370/254–256, 389, 338; 455/436, 435.2, 455/437–439, 444, 450–452.2, 453

See application file for complete search history.

(56) References Cited

U.S. PATENT DOCUMENTS 7,613,171 B2 * 11/2009 Zehavi ................ H04L 12/5692
370/338
8,590,023 B2 * 11/2013 Gupta ................... H04W 12/06
370/329

(Continued)

FOREIGN PATENT DOCUMENTS

JP 2010/509831 3/2010
KR 10-2010-0101902 9/2010
(Continued)

OTHER PUBLICATIONS

PCT International Application No. PCT/KR2012/010757, Written Opinion of the International Searching Authority dated Mar. 26, 2013, 15 pages.
(Continued)

*Primary Examiner* — Hanh N Nguyen
(74) *Attorney, Agent, or Firm* — Lee, Hong, Degerman, Kang & Walmey; Jonathan Kang; Michael Monaco

(57) ABSTRACT

Disclosed are a method for data offloading in a wireless communication supporting multiple radio access networks, and a device for the same. Specifically, the method comprises: a step in which a neighboring cell report including an identifier for a wireless local area network (WLAN) access point (AP) is received from a first terminal and a second terminal; a step in which, if the first and second terminals are communicating with one another and the WLAN AP identifiers transmitted by the first and second terminals are the same, an offloading indication message, indicating the offloading of first and second terminal data, is transmitted to the WLAN AP having the WLAN AP identifier; and a step in which an offloading command message, ordering the transmission and reception of data via the WLAN AP, is transmitted to the first and second terminals.

16 Claims, 10 Drawing Sheets

(51) Int. Cl.
*H04W 28/08* (2009.01)
*H04W 48/20* (2009.01)
*H04W 88/08* (2009.01)
*H04W 84/12* (2009.01)

(56) References Cited

U.S. PATENT DOCUMENTS

| | | | | |
|---|---|---|---|---|
| 9,025,579 B2* | 5/2015 | Kwon | ............... | H04W 76/026 370/338 |
| 2012/0230189 A1* | 9/2012 | Fang | ............... | H04W 28/08 370/230 |

FOREIGN PATENT DOCUMENTS

| | | |
|---|---|---|
| KR | 10-2011-0008462 | 1/2011 |
| WO | 2011/110108 | 9/2011 |

OTHER PUBLICATIONS

3rd Generation Partnership Project (3GPP), "Technical Specification Group Services and System Aspects; 3GPP system to Wireless Local Area Network (WLAN) interworking; System description (Release 10)," 3GPP TS 23.234 V10.0.0, Mar. 2011, 84 pages.

3rd Generation Partnership Project (3GPP), "Technical Specification Group Services and System Aspects; Architecture enhancements for non-3GPP accesses (Release 11)," 3GPP TS 23.402 V11.0.0, Sep. 2011, 232 pages.

Balasubramanian, et al., "Augmenting Mobile 3G Using WiFi," In: MobiSys 2010, Jun. 2010, 13 pages.

Lee, et al., "Mobile Data Offloading: How Much Can WiFi Deliver?," In: Co-NEXT 2010, Article No. 26, Dec. 2010, 12 pages.

PCT International Application No. PCT/KR2012/010757, Written Opinion of the International Searching Authority dated Mar. 26, 2013, 11 pages.

Korean Intellectual Property Office Application Serial No. 10-2014-7019026, Notice of Allowance dated Nov. 27, 2015, 2 pages.

* cited by examiner

METHOD FOR DATA OFFLOADING IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2012/010757, filed on Dec. 11, 2012, which claims the benefit of U.S. Provisional Application Ser. No. 61/570,267 filed on Dec. 13, 2011, the contents of which are all hereby incorporated by reference herein in their entirety.

FIELD OF THE INVENTION

The present invention relates to a wireless communication system and, more particularly, to a method for data offloading in a wireless communication supporting a multiple Radio Access Network and a device for the same.

BACKGROUND ART

A standard for Wireless Local Area Network technology is being developed as an IEEE (Institute of Electrical and Electronics Engineers) 802.11 standard. IEEE 802.11a and b use an unlicensed band at 2.4. GHz or 5 GHz, and IEEE 802.11b provides a transmission rate (or transmission speed) of 11 Mbps, and IEEE 802.11a provides a transmission rate of 54 Mbps. IEEE 802.11g provides a transmission rate of 54 Mbps, by applying OFDM (Orthogonal frequency-division multiplexing) at 2.4 GHz. IEEE 802.11n provides a transmission rate of 300 Mbps with respect to 4 spatial streams, by applying MIMO-OFDM (multiple input multiple output-OFDM). And, IEEE 802.11n supports a channel bandwidth of up to 40 MHz, and, in this case, IEEE 802.11n provides a transmission rate of 600 Mbps.

DETAILED DESCRIPTION OF THE INVENTION

Technical Objects

An object of the present invention is to propose a method for easily transceiving (transmitting/receiving) data between user equipments in a wireless communication system and, preferably, in a wireless communication system supporting a multiRadio Access Network.

Additionally, an object of the present invention is to propose a method for offloading data, so that data, which are being transceived (transmitted/received) between user equipments through a cellular network, can be tranceived through a WLAN (Wireless Local Area Network) AP (Access Point), which is located within a communication range of a base station having the corresponding user equipments located therein.

The technical objects of the present invention will not be limited only to the objects described above. Accordingly, technical objects that have not been mentioned above or additional technical objects of the present application may become apparent to those having ordinary skill in the art from the description presented below.

Technical Solutions

In an aspect of the present invention, as a data offloading method in a wireless communication system supporting multi Radio Access Network, the data offloading method includes the steps of receiving a neighboring cell report message including an identifier of a WLAN (Wireless Local Area Network) AP (Access Point), the WLAN AP being searched by a first user equipment and a second user equipment, from the first user equipment and the second user equipment, when the first user equipment and the second user equipment are communicating with one another, and when the WLAN AP identifier transmitted by the first user equipment is identical to the WLAN AP identifier transmitted by the second user equipment, transmitting an offloading indication message indicating data offloading between the first user equipment and the second user equipment to a WLAN AP having the WLAN AP identifier and transmitting an offloading command message commanding data transception through the WLAN AP to the first user equipment and the second user equipment.

In another aspect of the present invention, as a base station performing data offloading in a wireless communication system supporting multi Radio Access Network, the base station includes an RF (Radio Frequency) unit configured to transceive a radio signal and a processor configured to receive a neighboring cell report message including an identifier of a WLAN (Wireless Local Area Network) AP (Access Point), the WLAN AP being searched by a first user equipment and a second user equipment, from the first user equipment and the second user equipment, to transmit an offloading indication message indicating data offloading between the first user equipment and the second user equipment to a WLAN AP having the WLAN AP identifier, when the first user equipment and the second user equipment are communicating with one another, and when the WLAN AP identifier transmitted by the first user equipment is identical to the WLAN AP identifier transmitted by the second user equipment, and to transmit an offloading command message commanding data transception through the WLAN AP to the first user equipment and the second user equipment.

Preferably, alternatively or additionally, data transception through the WLAN AP may be performed by using a local transmission method only through the WLAN AP by having the WLAN AP relay traffic of the user equipments without having to pass through a broadband network.

Preferably, alternatively or additionally, a step of transmitting an offload request message verifying whether or not to perform data transception through the WLAN AP to the first user equipment and the second user equipment and an offloading response message indicating whether or not the data transception through the WLAN AP has been accepted from the first user equipment and the second user equipment may be received.

Preferably, alternatively or additionally, whether or not the data transception through the WLAN AP has been accepted may be decided based upon at least any one of a QoS (Quality of Service) available when data are transceived through the WLAN AP and an amount of power required for transceiving data through the WLAN AP.

Preferably, alternatively or additionally, an offloading confirmation message indicating whether or not offloading of data of the first user equipment and the second user equipment has been accepted may be received from the WLAN AP.

Preferably, alternatively or additionally, the offloading request message may include at least any one of an identifier of the WLAN AP, identifiers of the first user equipment and the second user equipment, and an indicator indicating data transmission through the WLAN AP.

Preferably, alternatively or additionally, the offloading indication message may include a MAC (Medium Access Control) address of the first user equipment and the second user equipment.

Additionally, in another aspect of the present invention, as a data offloading method in a wireless communication system supporting multi Radio Access Network, the data offloading method includes the steps of receiving a neighboring cell report message including an identifier of a WLAN (Wireless Local Area Network) AP (Access Point), the WLAN AP being searched by a first user equipment and a second user equipment, from the first user equipment and the second user equipment, when the first user equipment and the second user equipment are communicating with one another, and when a first WLAN AP having a WLAN AP identifier transmitted by the first user equipment and a second WLAN AP having a WLAN AP identifier transmitted by the second user equipment are connected to one another by a dedicated network, transmitting an offloading indication message indicating data offloading between the first user equipment and the second user equipment to the first WLAN AP and the second WLAN AP and transmitting an offloading command message commanding data transception through the first WLAN AP and the second WLAN AP to the first user equipment and the second user equipment.

In another aspect of the present invention, as a base station performing data offloading in a wireless communication system supporting multi Radio Access Network, the base station includes an RF (Radio Frequency) unit configured to transceive a radio signal and a processor configured to receive a neighboring cell report message including an identifier of a WLAN (Wireless Local Area Network) AP (Access Point), the WLAN AP being searched by a first user equipment and a second user equipment, from the first user equipment and the second user equipment, to transmit an offloading indication message indicating data offloading between the first user equipment and the second user equipment to the first WLAN AP and the second WLAN AP, when the first user equipment and the second user equipment are communicating with one another, and when a first WLAN AP having a WLAN AP identifier transmitted by the first user equipment and a second WLAN AP having a WLAN AP identifier transmitted by the second user equipment are connected to one another by a dedicated network, and to transmit an offloading command message commanding data transception through the first WLAN AP and the second WLAN AP to the first user equipment and the second user equipment.

Effects of the Invention

According to the exemplary embodiment of the present invention, data may be easily transceived (transmitted/received) between user equipments in a wireless communication system and, preferably, in a wireless communication system supporting a multiple Radio Access Network.

Additionally, according to the exemplary embodiment of the present invention, by offloading data, so that data, which are being transceived (transmitted/received) between user equipments through a cellular network, can be tranceived through a WLAN (Wireless Local Area Network) AP (Access Point), which is located within a communication range of a base station having the corresponding user equipments located therein, the transmission rate of the user equipment may be enhanced, and a load of the radio access network may be adjusted to be in balance.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

BEST MODE FOR CARRYING OUT THE PRESENT INVENTION

Figure 1:
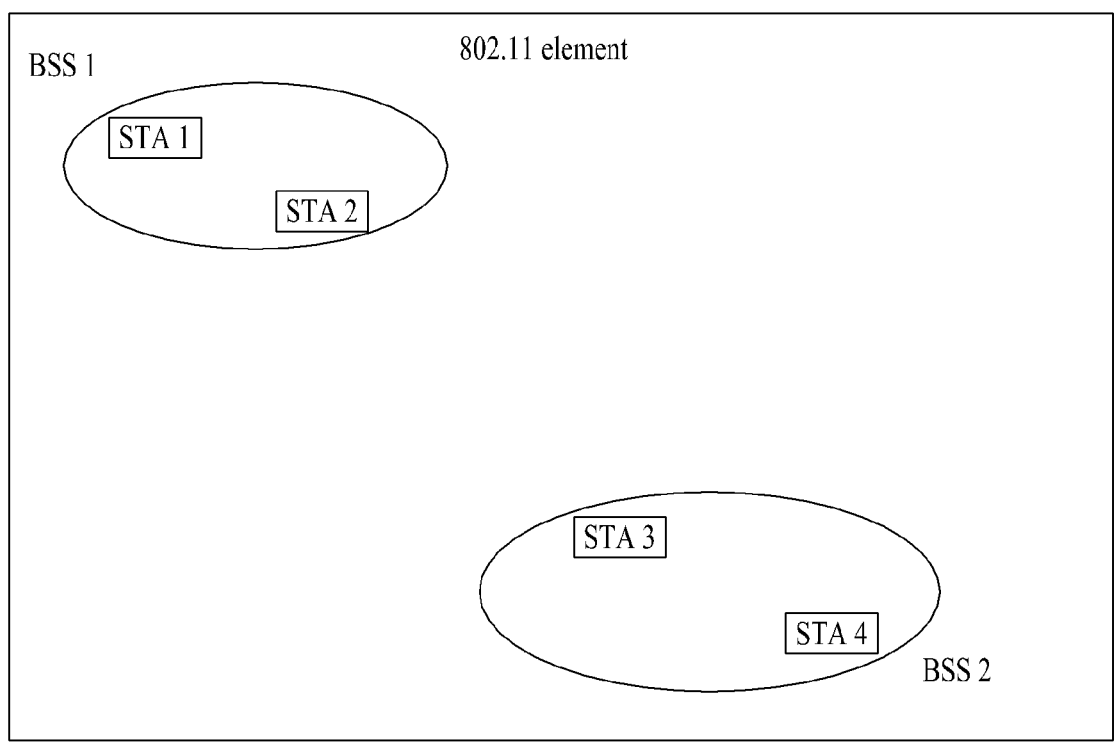
FIG. 1 illustrates an exemplary structure of a WLAN system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

In the description of the present invention, the embodiments of the present invention will be described by mainly focusing on the data transmission and reception relation between the base station and the terminal (or user equipment).

Herein, the base station may refer to a terminal node of the network that performs direct communication with the terminal. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term 'Base Station (BS)' may be replaced by other terms, such as fixed station, Node B, eNode B (eNB), Access Point (AP), and so on. The term 'relay' may be replaced by terms including Relay Node (RN), Relay Station (RS), and so on. Additionally, the term 'Terminal' may be replaced by terms including UE (User Equipment), MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, D2D device (Device-to-Device) device, and so on.

The specific terms used in the following description of the present invention are provided to facilitate the understanding of the present invention. And, therefore, without deviating from the technical scope and spirit of the present invention, such specific terms may also be varied and/or replaced by other terms.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

1. General Description of WLAN (Wireless Local Area Network) to which the Present Invention can be Applied FIG. 1 illustrates an exemplary structure of a WLAN system.

Referring to FIG. 1, the WLAN system includes more than one BBS (Basic Service Set). The BBS corresponds to a group of Stations (STAs), which are successfully synchronized with one another, so as to be capable of communicating with one another. FIG. 1 shows an example of 2 BBSs and 2 STAs being accessed to each BSS. Oval markings in FIG. 1 indicate coverage areas of the BSS, and this will be referred to as a BSA (Basic Service Area). In case the STA moves outside of the boundaries of the BSA, the STA can no longer perform direct communication with another STA existing in the BSA.

The BSS is divided into IBBS (Independent BSS) and an Infrastructure BSS. The IBBS corresponds to the most basic type of the WLAN system, and the IBBS is shown in FIG. 1. In the IBBS, direct communication may be performed between STAs, and a type of such inter-STA operation is referred to as an ad hoc network.

In order to access the BSS, an STA should perform a procedure for establishing synchronization with the base station. Additionally, in order to access all services of the Infrastructure BSS, the STA should be in association with the base station. Such association procedure is performed dynamically and includes usage of a DSS (Distribution System Service).

Figure 2:
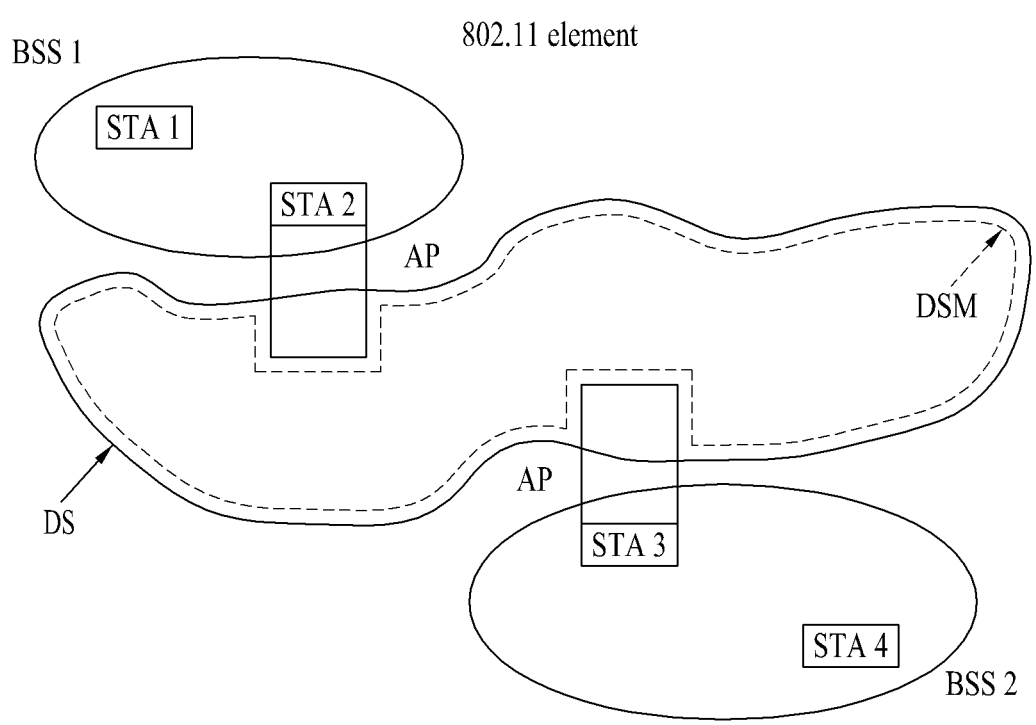
FIG. 2 illustrates another exemplary structure of a WLAN system.

FIG. 2 illustrates another exemplary structure of a WLAN system.

A direct distance between an STA and an STA may be physically limited. Depending upon the network, this distance may be sufficient, however, if the distance is insufficient, the extension in the coverage may be required. Accordingly, the BSS may be configured as an element of an extended form of network consisting of multiple BSSs. As described above, an architecture element being used for interconnecting the BSSs is referred to as a DS (Distribution System).

As a mechanism connecting multiple APs, the DS is not necessarily required to be a network, and, if a predetermined distribution service can be provided, there is no limitation in the form of the DS. For example, the DS may correspond to a wireless network (or radio network), such as a mesh network, or may correspond to a physical architecture configured to interconnect the APs.

In the WLAN system, a DSM (Distribution System Medium) and a WM (Wireless Medium) may be logically differentiated from one another. Each logical medium may be used for a different purpose by different elements of the architecture. By having the DS provide a logical service that is required for managing seamless integration of multiple BSSs and address mapping to a destination, mobility of the device is supported.

The AP (Access Point) corresponds to an entity supporting an associated STA, so that the associated STA can access the distribution system through the WM. Data between the BSS and the DS is transported through such AP. Herein, since all APs may correspond to STAs, the AP also corresponds to an entity being assigned with an address. However, in order to perform communication through the WM and to perform communication through the DSM, the addresses used by the APs are not required to be identical to one another.

Figure 3:
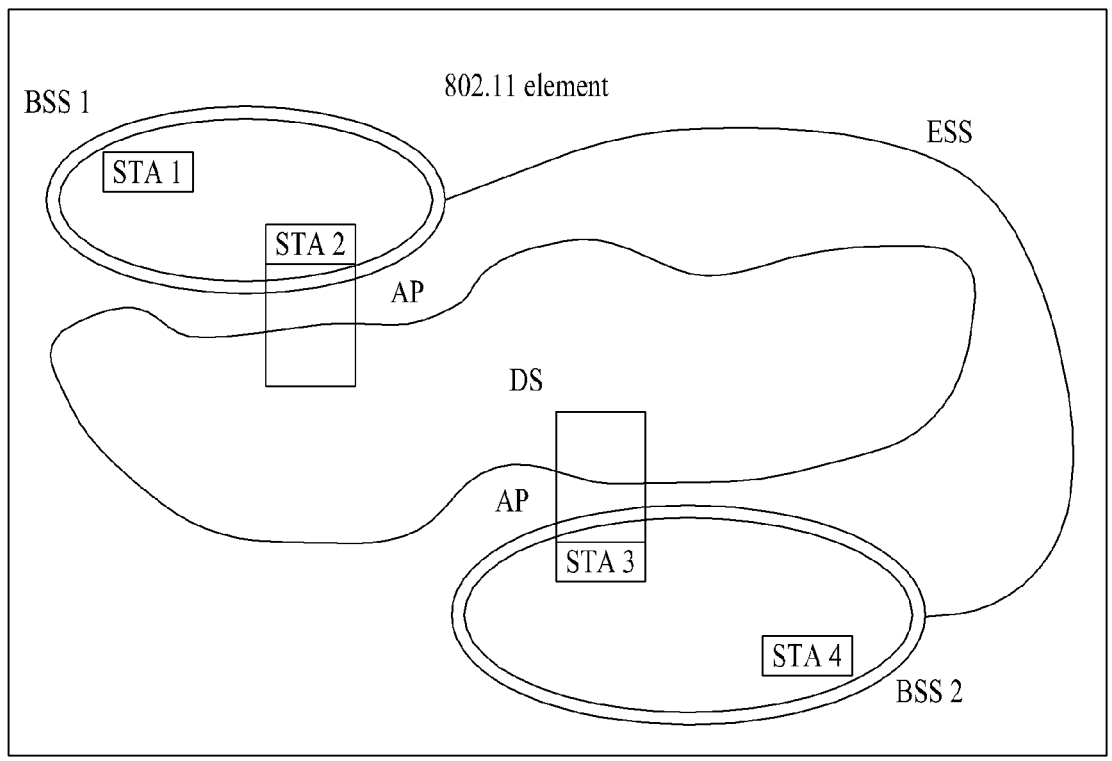
FIG. 3 illustrates yet another exemplary structure of a WLAN system.

FIG. 3 illustrates yet another exemplary structure of a WLAN system.

A wireless network having an arbitrary size and complexity may be configured by using a DS and a BSS, and such network type is referred to as an ESS (Extended Service set).

The ESS refers to multiple BSSs being connected through the DS and does not include a DS. Since the ESS network has an LLC (Logical Link Control) layer that is identical to the LLC layer of the IBSS layer, the STA belonging to the ESS may move transparently to the LLC to one BSS to another BSS.

In order to create physically continuous coverage, the BSSs may partially overlap (or overlay) one another. And, since there is not limitation in the logical distance between the BSSs, the BSSs may not be physically connected to one another. Additionally, in order to avoid unnecessary overlapping, one (or more than one) IBSS or ESS network may exist as one (or more than one) ESS network in physically identical space for a case when an ad hoc network is being operated in a location having an ESS network, or for a case when each WLAN system network physically overlapping one another is set up as a different architecture, or for a case when multiple access or security policies each being different from one another are being required.

As a logical entity including MAC (Medium Access Control) and a Physical Layer interface respective to a wireless medium, the above-described STA includes an AP STA (AP Station) and a Non-AP STA (Non-AP Station). Among the STAs, a mobile user equipments being manipulated by the user corresponds to a Non-AP STA, and, when simply referred to as an STA, the STA may also indicate a Non-AP STA. The Non-AP STA may also be referred to as other terms, such as a terminal, a WTRU (Wireless Transmit/Receive Unit), a UE (User Equipment), an MS (Mobile Station), a Mobile Terminal, a Mobile Subscriber Unit, and so on. Additionally, the AP corresponds to a functional entity providing access to a DS (Distribution system) to an STA (Associated Station), which is coupled to the corresponding AP, by passing through a wireless medium. The AP may also be referred to as BS (Base Station), Node-B, BTS (Base Transceiver System), Femto BS, or site controller, and so on.

Figure 4:
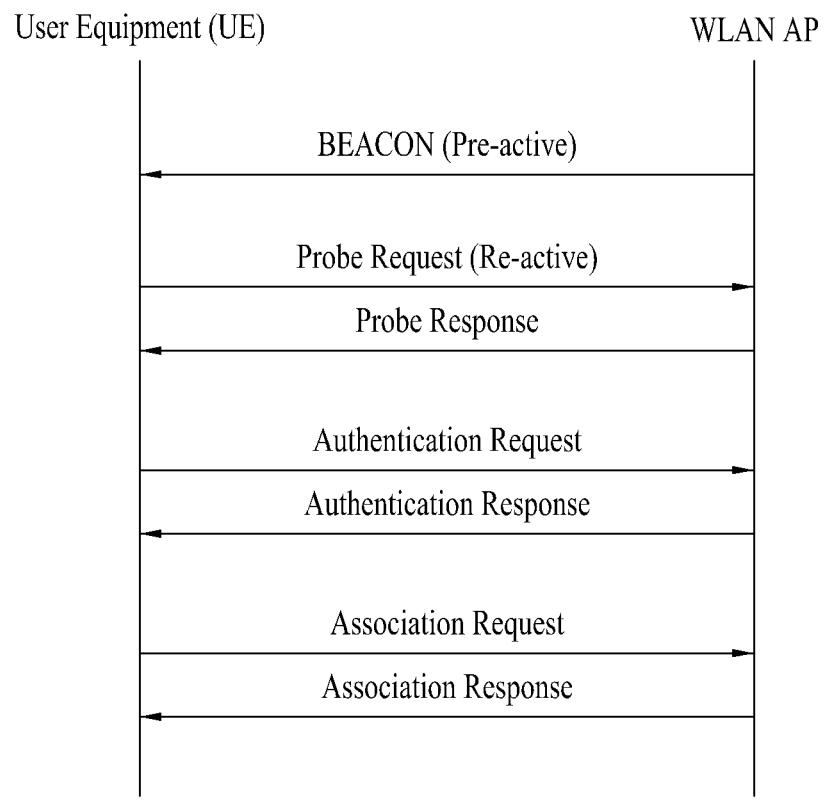
FIG. 4 illustrates an exemplary procedure for having a user equipment access an AP in a WLAN system.

FIG. 4 illustrates an exemplary procedure for having a user equipment access an AP in a WLAN system.

Referring to FIG. 4, the AP periodically generates and transmits a broadcast type Beacon frame. After receiving the beacon frame, the user equipment detects the presence of an access point. The Beacon frame may be configured to include a header, a frame body, and an FCS (Frame Check Sequence), and the Beacon frame may include information, such as Time stamp, Beacon interval, Capability, SSID (Service Set Identifier), and Supported rates, and so on. The SSID (Service Set Identifier) corresponds to an identifier that is used for identifying multiple basic service sets each being different from one another in a WLAN system, and the SSID may also be referred to as a basic service set identifier (BSSID).

The user equipment receives a beacon frame, and the user equipment verifies the presence of multiple APs that are available for access (accessible APs) through the received beacon frames. This is referred to as passive scanning. The user equipment selects a specific AP among the multiple APs and transmits a Probe Request frame to the selected AP.

Meanwhile, the user equipment may store information on the APs to which the user equipment has already accessed as profile. After storing the information on the APs to which the user equipment has already accessed as profile, the user equipment may be capable of selecting an AP from a next profile without having to receive a beacon frame, and the user equipment may then transmit a probe request frame to the selected access point. This is referred to as active scanning.

The probe request frame may be configured to include a header, a frame body, and a frame check sequence (FCS), and the probe request frame may include information, such as Service Set Identifier (SSID), Supported rates, and so on. As described above, the service set identifier corresponds to an identifier that is used for differentiating (or identifying) the basic service set, and any user equipment that is not aware (or informed) of the unique service set identifier of a specific basic service set is incapable of accessing the correction basic service set. More specifically, in order to access a specific basic service set, i.e., in order to access an AP, the user equipment sends out a service set identifier by loading the service set identifier in a probe request frame.

After receiving the probe request frame, the AP transmits a Probe Response frame to the user equipment as a response to the probe request frame. The Probe Response frame may be configured to include a header, a frame body, and a Frame Check Sequence (FCS), and the Probe Response frame may include information, such as Time stamp, Beacon interval, capability, Service Set Identifier (SSID), and Supported rates, and so on. This series of processes is referred to as a Search procedure.

After undergoing the Search procedure, the user equipment and the AP perform an Authentication procedure. More specifically, after receiving the probe response frame from the AP, the user equipment transmits an Authentication Request frame to the AP in order to request Authentication. Thereafter, by having the AP transmit an Authentication Response frame to the user equipment, authentication between the AP and the user equipment is established. The authentication request frame and/or the authentication response frame may be configured to include a header, a frame body, and a frame check sequence (FCS), and the authentication request frame and/or the authentication response frame may include information, such as an Authentication algorithm number, an Authentication transaction sequence number, and a Status code, and so on.

After undergoing the Authentication procedure, the user equipment and the AP perform an Association procedure. More specifically, after establishing authentication between the AP and the user equipment, the user equipment transmits an Association Request frame to the AP. The Association Request frame may be configured to include a header, a frame body, and a frame check sequence (FCS), and the Association Request frame may include information, such as Capability, Listen interval, service set identifier (SSID), and supported rates, and so on.

Then, by having the AP transmit an Association Response frame to the user equipment as a response to the Association request frame, association with the user equipment is established. The association request frame may be configured to include a header, a frame body, and a frame check sequence (FCS), and the Association Request frame may include information, such as Capability, Status Code, AID (Association ID), and supported rates, and so on. Herein, the association ID (AID) refers to a specific identifier that is assigned to each user equipment in order to allow the AP to identifier each of the multiple user equipment, after the association between the AP and the user equipments is established.

2. Data Offloading Method

In the present invention, when communication is established between user equipments that are located within a coverage of a specific mobile communication base station (or cell), in order to transceive (transmit/receive) such communication data between two user equipments, a method for transceiving (transmitting/receiving) data between user equipments by using a WLAN communication method through a WLAN AP that can be accessed by the corresponding user equipments is defined. More specifically, in the present invention, a method of having a user equipment accessing a specific base station periodically search for a beacon signal of a WLAN AP that can perform communication with the corresponding user equipment and having the user equipment report the identifier of the corresponding WLAN AP to the base station, and a method of having user equipments accessing the base station and performing communication with one another receive a request to shift the communication method from the base station and having the user equipments perform communication through a specific WLAN AP by using the WLAN communication method, are defined. Additionally, in the present invention, a method of having the WLAN AP receive from the base station a request for establishing communication between specific user equipments by using a local transmission method, wherein communication is established only through the corresponding AP, and having the WLAN AP perform quick communication between the corresponding user equipments without any delay respective to a broadband network connection, is defined.

Hereinafter, in this specification, it will be assumed that the user equipment corresponds to a user equipment that is equipped with a RAT (RAT Radio Access Technology) function allowing communication to be established by using a cellular mobile communication method and a RAT function allowing communication to be established by using a WLAN communication method.

Additionally, it will be assumed that the WLAN AP according to the present invention has its location registered by a specific mobile communication operator (or manager), that the WLAN AP corresponds to a WLAN AP that can be controlled by a base station or by a mobile core network having a base station accessed thereto, and that the base station and the WLAN AP are interconnected in a state of being capable of communicating with one another through a specific network. Although an exemplary structure of a network to which the present invention may be applied is given as an example in FIG. 5 shown below, the network structure will not be limited only to this, and the present invention may be applied to any wireless (or radio) communication system supporting a heterogeneous (multi) radio access network.

Figure 5:
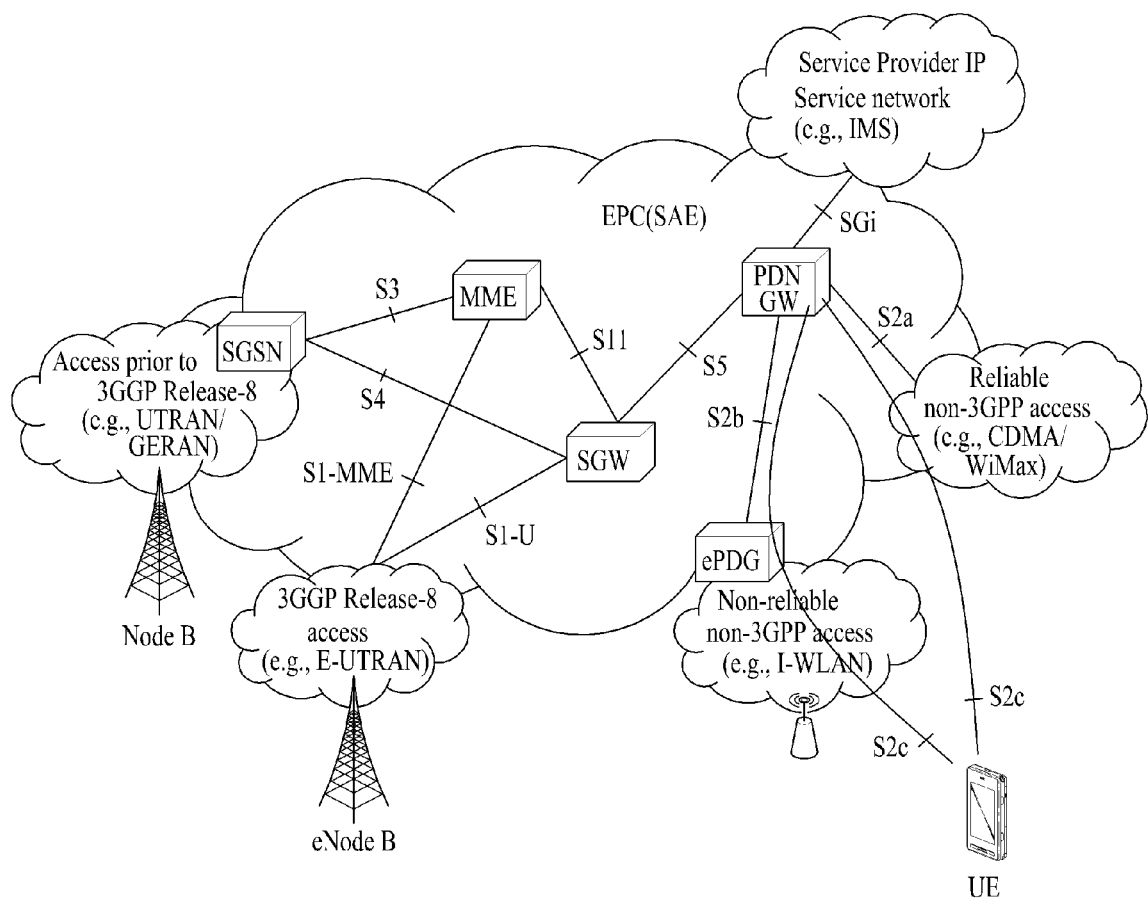
FIG. 5 illustrates an exemplary structural diagram of a network to which the present invention may be applied.

FIG. 5 illustrates an exemplary structural diagram of a network to which the present invention may be applied.

In order to respond to several forums and new technologies related to $4^{th}$ generation mobile communication, as an effort to optimize and enhance the performance of 3GPP technologies from the end of year 2004, 3GPP, which establishes a technical standard of $3^{rd}$ generation mobile communication systems, has initiated research on LTE/SAE (Long Term Evolution/System Architecture Evolution) technologies.

SAE, which is developed based upon 3GPP SA WG2, corresponds to a research related to network technologies targeted to decide a network structure by alternating processes with LTE processes of 3GPP TSG RAN and to support mobility between heterogeneous networks, and the SAE corresponds to one of the most important standardization issues in recent 3GPP. As a process for evolving the 3GPP system to an IP (Internet Protocol) based system supporting diverse radio access technologies, the processes of the SAE have been carried out to target an optimized packet based system minimizing transmission delay with a more enhanced data transmission capability.

An SAE higher level reference model, which is defined in 3GPP SA WG2, includes a non-roaming case and a roaming case respective to diverse scenarios, and reference may be made to 3GPP standard documents TS 23.401 and TS 23.402 for detailed description of the same. A brief reconfiguration of the SAE higher level reference model is shown in the network structure diagram of FIG. 5, which shows a general structure of an EPS (Evolved Packet System) including EPC (Evolved Packet Core).

The EPC corresponds to an essential element of an SAE (system Architecture Evolution) for enhancing the performance of 3GPP technologies. SAE corresponds to a research project for deciding a network structure that supports the mobility between diverse types of networks. The SAE, for example, is targeted to provide a packet based system that is optimized for supporting diverse radio access technologies based on IP and for providing a more enhanced data transmission capability.

More specifically, EPC corresponds to a Core Network of an IP mobile communication system for a 3GPP LTE system, and the EPC may support packet-based real time and non-real time services. In the conventional mobile communication system (i.e., $2^{nd}$ generation or $3^{rd}$ generation mobile communication system), the core network structure was realized through 2 different sub-domains, such as CS (Circuit-Switched) for sound and PS (Packet-Switched) for data. However, in the 3GPP LTE system, which corresponds to an evolved version of the $3^{rd}$ generation mobile communication system, the CS and PS sub-domains have been unified to a single IP domain. More specifically, in the 3GPP LTE system, a connection between user equipment and user equipment each having IP capability may be configured through an IP based base station (e.g., eNodeB (evolved Node B)), EPC, application domain (e.g., IMS (IP Multimedia Subsystem)). More specifically, the EPC corresponds to a structure that is essential for the realization of an end-to-end IP service.

The EPC may include diverse elements, and FIG. 5 shows an example of SGW (Serving Gateway), PDN GW (Packet Data Network Gateway), MME (Mobility Management Entity), SGSN (Serving GPRS (General Packet Radio Service) Supporting Node), ePDG (enhanced Packet Data Gateway), which correspond to some of the diverse elements.

SGW operates as a boundary point between a RAN (Radio Access Network) and a Core Network, and SGW corresponds to an element that performs a function of maintaining a data path between the eNodeB and the PDN GW. Additionally, in case the user equipment is moved along an area that is served by the eNodeB, the SGW performs the function of a local mobility anchor point. More specifically, for mobility within an E-UTRAN (Evolved-UMTS (Universal Mobile Telecommunication System) Terrestrial Radio Access Network that is defined after 3GPP release-8), packets may be routed through the SGW. Additionally, the SGW may also function as an anchor point for the mobility with another 3GPP network (a RAN that is defined prior to 3GPP release-8, e.g., UTRAN or GERAN (GSM (Global System for Mobile Communication)/EDGE (Enhanced Data rates for Global Evolution) Radio Access Network).

PDN GW (or P-GW) corresponds to a termination point of a data interface directed to a packet data network. PDN GW may support policy enforcement features, packet filtering, charging support, and so on. Additionally, PDN GW may function as an anchor point for mobility management between a 3GPP network and a non-3GPP network (e.g., a non-reliable network, such as I-WLAN (Interworking Wireless Local Area Network) and a reliable network, such as CDMA (Code Division Multiple Access) network or WiMax).

In the exemplary network structure of FIG. 5, although SGW and PDN GW are illustrated to be configured as separate gateways, two gateways may be configured in accordance with a Single Gateway Configuration Option.

MME corresponds to an element performing signaling and control functions for supporting access to a network connection of a user equipment, allocation of network resources, tracking, paging, roaming, and handover, and so on. MME controls control plane functions related to subscriber and session management. MME manages an extended number of eNodeBs and performs signaling for the selection of related art gateways for the handover respective to other 2G/3G networks. Additionally, MME performs the functions of Security Procedures, Terminal-to-network Session Handling, Idle Terminal Location Management, and so on.

SGSN performs handling of all packet data, such as user mobility management and authentication respective to another 3GPP network (e.g., GPRS network).

ePDG performs a function of a security node respective to a non-reliable non-3GPP network (e.g., I-WLAN, WiFi hospot, and so on).

As described above with reference to FIG. 5, a user equipment having an IP capability may access a service provider (i.e., an IP service network (e.g., IMS) provided by an operator) after passing through diverse elements within the EPC based upon a 3GPP access as well as a non-3GPP access.

Additionally, FIG. 5 illustrates diverse reference points (e.g., S1-U, S1-MME, and so on). In the 3GPP system, a conceptual link connecting 2 functions existing in different functional entities of E-UTRAN and EPC is defined as a reference point. Among the reference points shown in FIG. 5, S2*a* and S2*b* correspond to non-3GPP interfaces. S2*a* corresponds to a reference point providing related control and mobility support between a reliable non-3GPP access and a PDNGW to a user plane. S2*b* corresponds to a reference point providing related control and mobility support between an ePDG and a P-GW to a user plane. S2*c* corresponds to a reference point between a user equipment (UE) and a P-GW.

As described above, in addition to a GTP (GPRS Tunneling Protocol) protocol, which has been traditionally used in the conventional 3GPP while supporting non-3GPP interworking, the adoption of other diverse protocols of IETF (Internet Engineering Task Force) has been realized. Most particularly, IETF protocols of PMIPv6 (Proxy Mobile IPv6) and DSMIPv6 (Dual Stack Mobile IPv6), and so on, have been adopted in a draft version state prior to RFC (Request for Comments) of the IETF and is being used as a crucial protocol of non-3GPP interoperability in the current SAE standard. Essentially, a GTP protocol is used for inter-3GPP RAT (Inter-Radio Access Technology) handover, and IETF-based protocols are used for S2 interfaces for non-3GPP interoperability. Most particularly, reference point S5, which provides User Plane tunneling and tunnel management between an SGW and a P-GW and reference point S8 (not shown), which is used when performing roaming, may both support GTP and IETF-based protocols.

2.1. First Embodiment—Usage of One AP

An embodiment of a method of user equipments accessing the base station for offloading communication data between the corresponding user equipments through an accessible WLAN AP will be described. Hereinafter, in some cases, specific operations that are described as operations performed by the base station may also be performed by an upper node of the base station.

Figure 6:
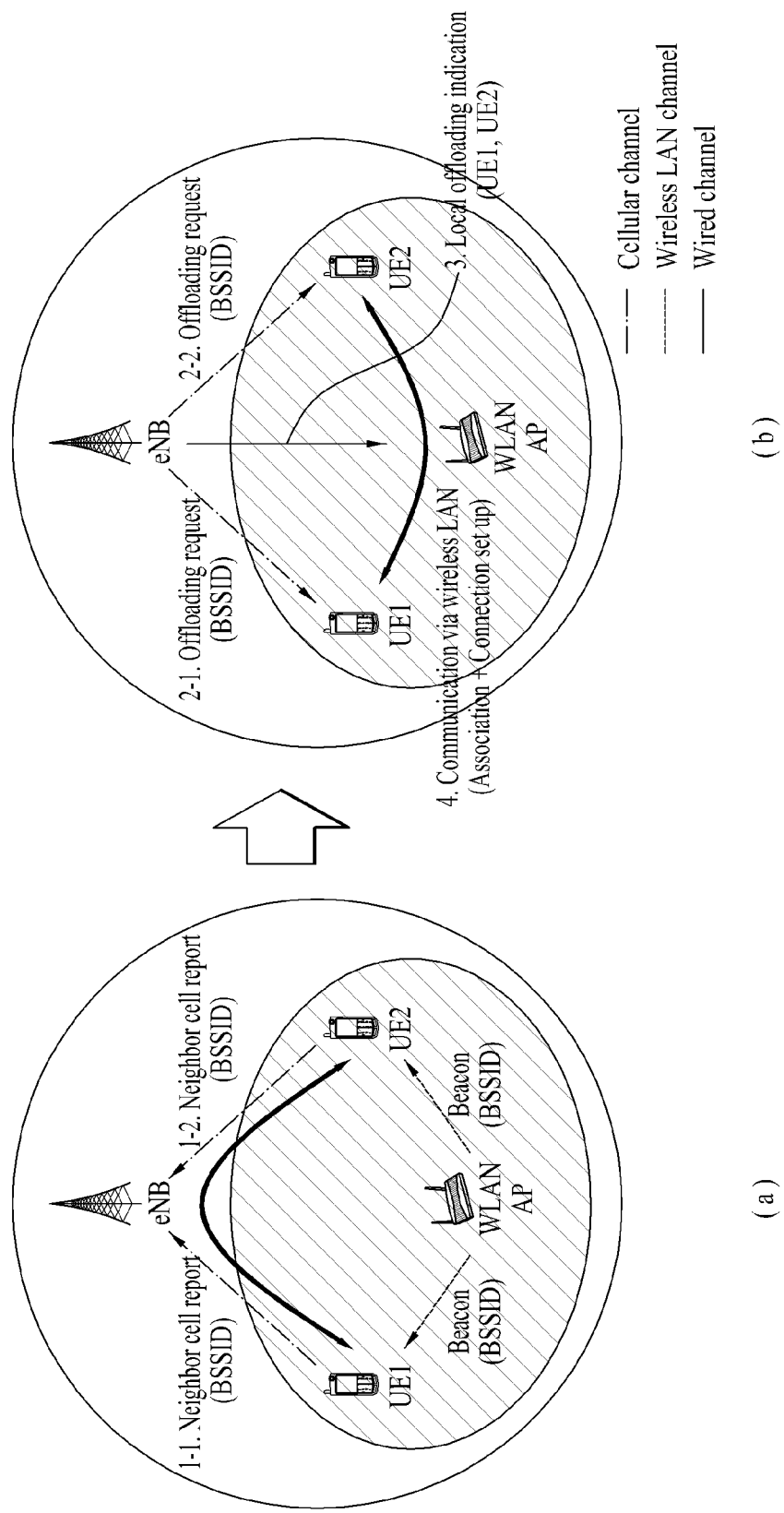
FIG. 6 illustrates an example of local traffic offloading according to an exemplary embodiment of the present invention.

FIG. 6 illustrates an example of local traffic offloading according to an exemplary embodiment of the present invention.

(a) of FIG. 6 corresponds to a schematic view of a procedure of user equipment 1 (UE 1) and user equipment 2 (UE 2), which are located within a transmission range (coverage) of the same base station (eNB), for searching for a neighboring WLAN AP, while accessing a cellular network through the base station and performing communication between one another, and for reporting information on the searched WLAN AP to the base station.

1-1, 1-2) User equipment 1 (UE 1) and user equipment 2 (UE 2) receives a beacon signal of the WLAN AP, the beacon signal being periodically transmitted, and, then, user equipment 1 (UE 1) and user equipment 2 (UE 2) reports a basic service set identifier (BSSID) of the searched WLAN AP to the base station through a neighbor cell report message. Subsequently, the base station determines whether or not user equipment 1 (UE 1) and user equipment 2 (UE 2), which have reported the BSSID of the WLAN AP to the base station, are currently communicating with one another and also determines whether or not user equipment 1 (UE 1) and user equipment 2 (UE 2) have each reported the same BSSID. At this point, in case user equipment 1 (UE 1) and user equipment 2 (UE 2) have each reported a different BSSID, user equipment 1 (UE 1) and user equipment 2 (UE 2) may each maintain their current status and transceive (transmit/receive) data to and from one another through the base station, as shown in (a) of FIG. 6.

Conversely, in case user equipment 1 (UE 1) and user equipment 2 (UE 2) are currently communicating with one another, and in case user equipment 1 (UE 1) and user equipment 2 (UE 2) have both reported the same BSSID, the base station, the WLAN AP, and each of the user equipments operate as shown in (b) of FIG. 6. Hereinafter, for simplicity in the description, a case when it is assumed that user equipment 1 (UE 1) and user equipment 2 (UE 2) have reported the same BSSID will be described.

(b) of FIG. 6 corresponds to a schematic view of a procedure of user equipments accessing a base station and performing communication with one another for receiving a request for switching (or shifting) the communication method by the base station or by a mobile communication core network having the base station accessing thereto and for performing communication by using a WLAN communication method through a specific WLAN AP.

2-1, 2-2) Since user equipment 1 and user equipment 2, which have reported the BSSID of the WLAN AP to the base station are currently communicating with one another, and since user equipment 1 and user equipment 2 have both reported the same BSSID, the base station transmits an offloading request message to user equipment 1 and user equipment 2 and inquires whether or not user equipment 1 and user equipment 2 will both perform communication by using a local transmission method through a WLAN AP, which can be accessed by both user equipment 1 and user equipment 2. As a response to this inquiry, each of user equipment 1 and user equipment 2 transmits an offloading response message to the base station, so as to notify the base station whether or not user equipment 1 and user equipment 2 will accept the local offloading request of the base station. At this point, if at least any one of user equipment 1 and user equipment 2 rejects (or refuses) the local offloading request, user equipment 1 and user equipment 2 may each maintain their current status and transceive (transmit/receive) data to and from one another through the base station, as shown in (a) of FIG. 6. Hereinafter, for simplicity in the description, a case when it is assumed that user equipment 1 and user equipment 2 have both accepted the local offloading request will be described.

3) After receiving the local offloading response message indicating the local offloading acceptance from user equipment 1 and user equipment 2, the base station transmits a local offloading indication message to the corresponding WLAN AP, which is indicated by the BSSID, so as to indicate that, when user equipment 1 and user equipment 2 access the corresponding WLAN AP, the WLAN AP will process (relay) data traffic of user equipment 1 and user equipment 2 by using the local transmission method. Herein, the local transmission method refers to a method, wherein, when any one of user equipment 1 and user equipment 2 transmits data to the WLAN AP, the corresponding WLAN AP relays the traffic of the user equipment, without passing through a broadband network, which is used by a WLAN AP for accessing an internet network, thereby being capable of delivering data to the counterpart user equipment.

As a response to the local offloading indication message, the WLAN AP transmits a local offloading confirmation message, so as to notify the base station whether or not the corresponding local offloading request is accepted. At this point, in case the WLAN AP has rejected the local offloading request, user equipment 1 and user equipment 2 may each maintain their current status and transceive (transmit/receive) data to and from one another through the base station, as shown in (a) of FIG. 6. Hereinafter, for simplicity in the description, a case when it is assumed that the WLAN AP has accepted the local offloading request will be described.

4) After receiving the local offloading confirmation message accepting local offloading, the base station transmits a local offloading command message to user equipment 1 and user equipment 2, thereby ordering (or commanding) user equipment 1 and user equipment 2 to perform data transmission by using the local offloading method through the corresponding WLAN AP. Thereafter, after receiving the local offloading command message, user equipment 1 and user equipment 2 access the corresponding WLAN AP, thereby transceiving (transmitting/receiving) communication traffic between user equipment 1 and user equipment 2 by using a WLAN communication method.

Figure 7:
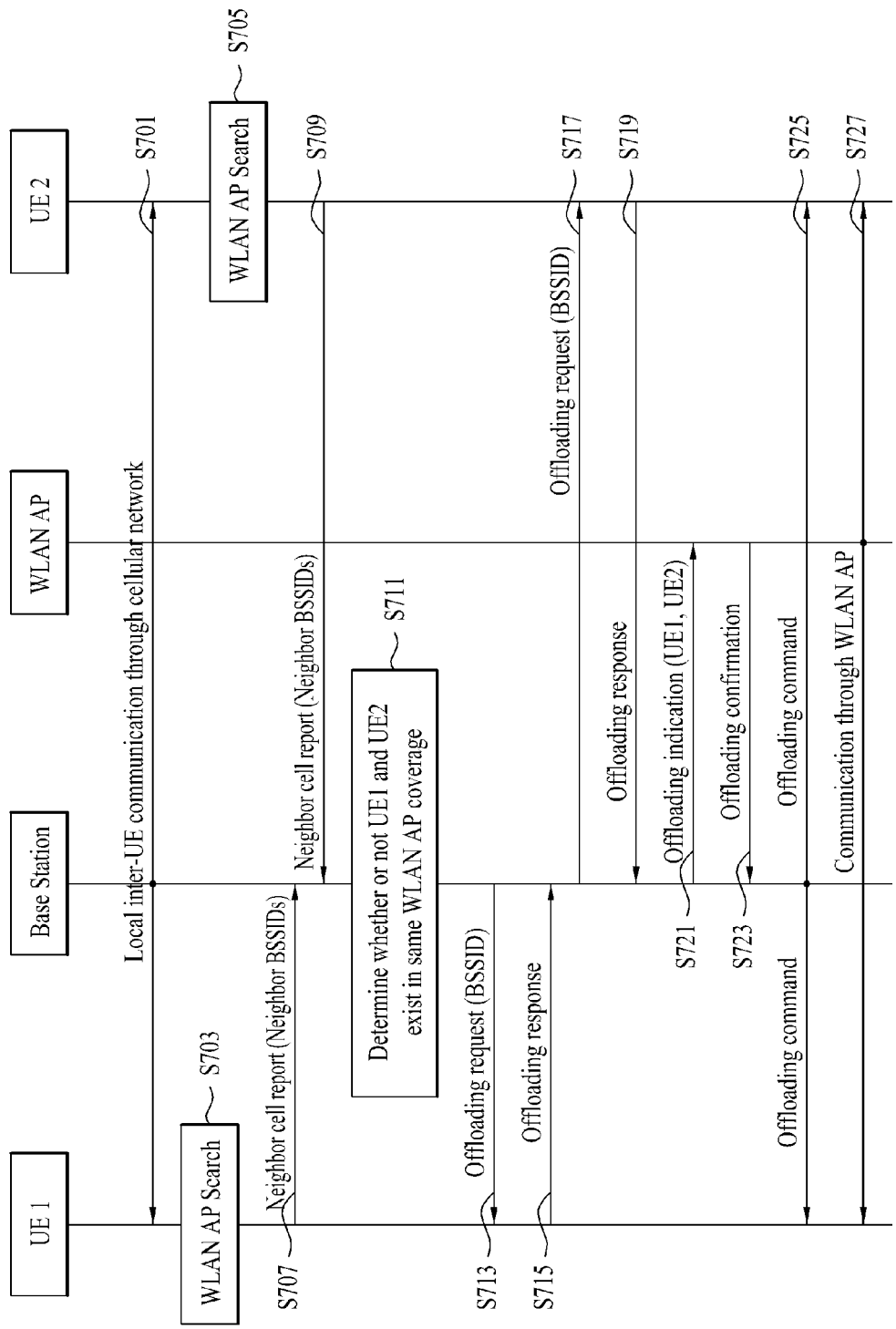
FIG. 7 illustrates an exemplary procedure of local traffic offloading according to an exemplary embodiment of the present invention.

FIG. 7 illustrates an exemplary procedure of local traffic offloading according to an exemplary embodiment of the present invention.

Referring to FIG. 7, while user equipment 1 (UE 1) and user equipment 2 (UE 2), which are located within a transmission range (coverage) of a specific mobile communication base station, are accessing a cellular network through the base station and are performing communication between one another (S701), user equipment 1 (UE 1) and user equipment 2 (UE 2) periodically search whether or not a neighboring WLAN AP, which is available for communication, exists (S703, S705). Herein, the method of each user equipment for searching for the corresponding WLAN AP may be performed by searching for a beacon frame, which is periodically transmitted by the WLAN AP, and by receiving the beacon frame.

As described above, the beacon frame may include information, such as time stamp, beacon interval, AP capability, SSID (Service Set Identifier), and supported rates, and so on. The SSID (Service Set Identifier) corresponds to an identifier that is used for identifying multiple basic service sets each being different from one another in a WLAN system, and the SSID may also be referred to as a basic service set identifier (BSSID).

After searching the WLAN AP, user equipment 1 and user equipment 2 transmit an ID (identifier) of the searched WLAN AP to the base station through a neighbor cell report message (S707, S709). More specifically, after receiving the beacon frame from the WLAN AP, among the information within the received beacon frame, user equipment 1 and user equipment 2 may transmit the BSSID of the WLAN AP, which has transmitted the corresponding beacon frame, to the base station through the neighbor cell report message.

The neighbor cell report message may include identifier information of one or more WLAN APs. Additionally, the neighbor cell report message may also optionally include AP capability information, supported rate information, and so on, which are included in the beacon frame. Moreover, the neighbor cell report message may be included in a neighbor base station report message of a conventional cellular network, which is included in the base station, and may then be transmitted, and the neighbor cell report message may also be transmitted separately from the neighbor base station report message of the conventional cellular network. Herein, in case the neighbor cell report message is transmitted separately from the neighbor base station report message of the conventional cellular network, the neighbor cell report message may be configured to have the same format as the neighbor base station report message of the conventional cellular network. Furthermore, in order to be differentiated from the neighbor base station report message of the conventional cellular network, indication information may be included in the message.

Meanwhile, as described in steps S703, S705, since user equipment 1 and user equipment 2 periodically search for neighboring WLAN APs, user equipment 1 and user equipment 2 may periodically transmit a neighbor cell report message including the identification information respective to the searched WLAN AP to the base station. Additionally, the neighbor cell report message may also be transmitted to the base station only when the searched neighbor WLAN AP is changed due to a change in the mobility or channel status of the user equipment.

After receiving a neighbor cell report message from the currently accessed user equipments, the base station verifies the BSSID of the WLAN AP, and may verify whether or not communication is currently being performed between the user equipments that have reported the BSSID, whether or not the corresponding user equipments exist within the same WLAN AP coverage, and whether or not user equipments having reported the same BSSID exist (S711). In case of FIG. 7, the base station verifies whether or not the BSSIDs of the WLAN AP reported by user equipment 1 and user equipment 2, which are currently accessing the base station and performing communication with one another, are identical to one another.

Among the user equipments having transmitted the neighbor cell report message, the base station, in case the user equipments are currently communicating with one another, and in case user equipments having reported the same BSSID exist, the base station transmits an offloading request message for verifying whether or not local transmission is to be performed to the corresponding user equipments through the WLAN (S713, S717). In case of FIG. 7, it is assumed that user equipment 1 and user equipment 2, which are currently accessing the base station, perform communication with one another, and that the same BSSID of the WLAN AP has been reported. More specifically, the base station transmits an offloading request message to user equipment 1 and user equipment 2. Herein, as shown in FIG. 7, each of step S713 and step S717 may also be transmitted at different time points, and the time points at which step S713 and step S717 are performed may be interchanged. Additionally, step S713 and step S717 may also be performed by the base station at the same time point.

The offloading request message may include at least one of BSSID information of the WLAN AP to which user equipment receiving the corresponding message are to access in order to perform local transmission, identifier information of user equipments becoming targets of the local transmission, and local offloading flag/indicator indicating that the corresponding transmission is being performed by using the local transmission method through the WLAN AP.

After receiving the offloading request message from the base station, the user equipments (user equipment 1 and user equipment 2) decide whether or not to shift (or switch) to a communication method via WLAN so as to perform local transmission, based upon available QoS (Quality of Service) when performing local transmission via the corresponding WLAN and/or based upon the amount of power required for transceiving data traffic through the corresponding WLAN, and the user equipments include the decided information in the offloading response message and transmits the message to the base station (S715, S719). For example, generally, since a power consumption may become larger when performing communication through WLAN, as compared to when performing communication through a cellular network, the user equipment may decide whether or not to shift the communication method to WLAN by comparing the amount of power currently held (or reserved) by user equipment with a pre-decided threshold value. Additionally, after receiving the offloading request message from the base station, the user equipment may compare inter-base station or inter-WLAN channel status (or channel status between base stations or between WLANs, level of interference, and so on, with a pre-decided threshold value, so as to decide whether or not to shift the communication method to WLAN, and, moreover, the user equipment may relatively compare the channel status, level of interference, and so on, between the user equipment and the base station with the channel status, level of interference, and so on, between the user equipment and the WLAN, so as to decide whether or not to shift the communication method to WLAN.

The offloading response message may include indication information indicating whether or not to have the user equipment perform shifting (or switching) of the communication method to WLAN.

After receiving the offloading response message from the user equipments, in case all of the corresponding user equipments (user equipment 1 and user equipment 2) have decided to perform local transmission, the base station transmits a local offloading indication message to the WLAN AP having the BSSID, which is reported by the corresponding user equipments (S721). More specifically, the base station may transmit a local offloading indication message to a WLAN AP having the BSSID, which is included in the offloading request message.

The local offloading indication message may include identifiers of user equipments, which are to perform communication through the corresponding WLAN AP. Herein, a MAC address of the user equipment may be used as an example of the identifier of the user equipment. The MAC address refers to an address having the length of 48 bits, which is assigned to each communication device (WLAN network adaptor equipped to the device), and the corresponding address is a globally unique address.

At this point, as described above, the base station and the WLAN AP may be connected to one another in a state available for communication through a specific network, and the WLAN AP may be controlled by the corresponding base station or by a mobile communication core network having the corresponding base station accessed thereto.

After receiving the local offloading indication message, the WLAN AP may optionally transmit a local offloading confirmation message to the base station (S723). More specifically, step S723 may also be omitted. As described above, in case step S723 is omitted, after transmitting the local offloading indication message to the WLAN AP, the base station may perform step S725 immediately or after a predetermined period of time has elapsed.

The local offloading confirmation message may include indication information indicating an acceptance or rejection of the local offloading, which is requested by the base station.

Hereinafter, for simplicity in the description, a case when it is assumed that step S723 is performed and that the WLAN AP has accepted the local offloading will be described.

After receiving the local offloading confirmation message from the WLAN AP, the base station transmits an offloading command message to the user equipments (user equipment 1 and user equipment 2), which are to perform local offloading (S725). Herein, the offloading command message may include the BSSID of the WLAN to which the user equipment are to access in order to perform local offloading.

After receiving the offloading command message, and after the access to the WLAN AP having the BSSID, which is included in the offloading command message, is established, the user equipment performs communication by using the local transmission method through the corresponding WLAN AP (S727). More specifically, the WLAN AP, which has received the local offloading indication message from the base station in step S721, is operated to allow inter-UE local transmission to be performed without having to pass through a broadband network, to which the corresponding WLAN AP is connected, when the user equipments having the identifier, which is included in the local offloading indication message, perform access. At this point, the access procedure of each user equipment to the WLAN AP may follow the conventional WLAN access procedure, as shown in FIG. 4. Additionally, each of the user equipments accessing the corresponding WLAN AP may disconnect the cellular connection, to which the user equipments are currently accessing, or may shift to an idle state/mode, thereby being capable of minimizing power consumption of the user equipment. The idle state refers to a state when the power of the user equipment is switched on, yet when the RRC (Radio Resource Control) connection is not set up. Herein, the RRC layer corresponds to a sublayer of radio interface Layer 3, which exists in the control plane, and the RRC layer provide an information transmission service to NAS (non-access stratum, and the RRC layer controls the settings of the radio interface layers 1 and 2 (Layer 1, 2).

Meanwhile, the above-described step S713 to step S719 may also be omitted. More specifically, among the user equipments having transmitted the neighbor cell report message, in case the user equipments are currently communicating with one another, and in case user equipments having reported the same BSSID exist, by transmitting a local offloading indication message to the WLAN AP, the base station may perform the remaining procedure starting from step S721. Additionally, in case step S723 is also omitted, after performing step S721, by transmitting an offloading command message to each of the user equipments, the base station may perform the remaining procedure starting from step S725. At this point, step S721 and step S725 may be performed at the same time point.

2.2. Second Embodiment—Usage of Multiple APs

Another embodiment of a method of user equipments accessing the base station for offloading communication data between the corresponding user equipments through an accessible WLAN AP will be described. Hereinafter, unlike the embodiment described above in (2.1.), multiple WLAN APs are located within the coverage of a specific base station, wherein the WLAN APs can be controlled by the corresponding base station or by a mobile communication core network having the corresponding base station access thereto, and the WLAN APs are connected in order to perform communication between the corresponding multiple WLAN APs. Hereinafter, for simplicity in the description, although a case when it is assumed that there are 2 user equipments, and that there are 2 WLAN APs respectively related to the local transmission of each user equipment, however, this embodiment will not be limited only to this, and, this embodiment may also be equally applied to a case when user equipments perform local transmission through 3 or more WLAN APs respectively related to each user equipment. Additionally, hereinafter, in some cases, specific operations that are described as operations performed by the base station may also be performed by an upper node of the base station.

Figure 8:
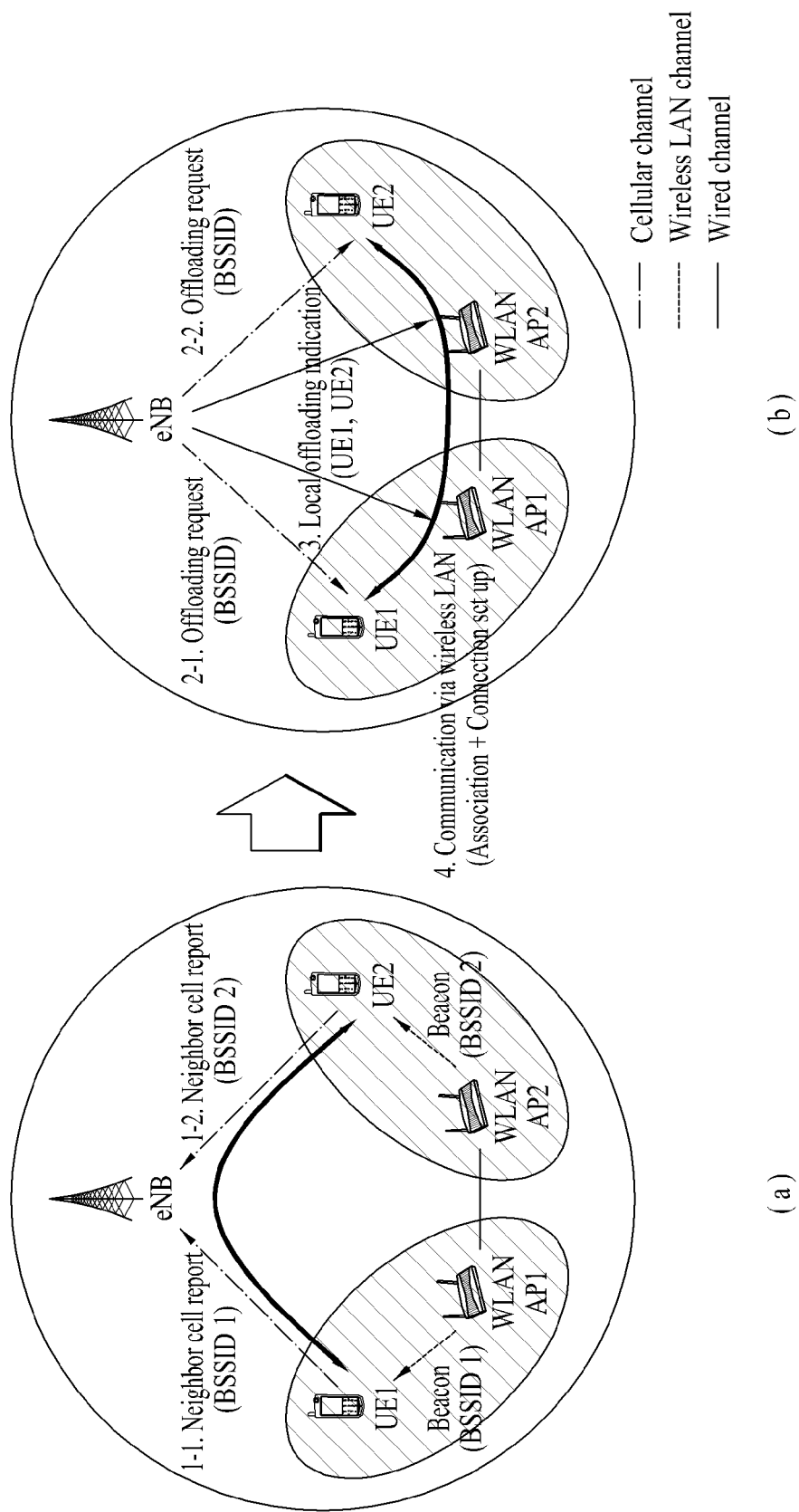
FIG. 8 illustrates an example of local traffic offloading according to an exemplary embodiment of the present invention.

FIG. 8 illustrates an example of local traffic offloading according to an exemplary embodiment of the present invention.

(a) of FIG. 8 corresponds to a schematic view of a procedure of user equipment 1 (UE 1) and user equipment 2 (UE 2), which are located within a transmission range (coverage) of the same base station (eNB), for searching for a neighboring WLAN AP, while accessing a cellular network through the base station and performing communication between one another, and for reporting information on the searched WLAN AP to the base station.

1-1, 1-2) User equipment 1 (UE 1) and user equipment 2 (UE 2) receives a beacon signal of the WLAN AP, the beacon signal being periodically transmitted, and, then, user equipment 1 (UE 1) and user equipment 2 (UE 2) reports a basic service set identifier (BSSID) of the searched WLAN AP to the base station through a neighbor cell report message. More specifically, user equipment 1 reports BSSID 1 of WLAN AP1 to the base station through a neighbor cell report message, and user equipment 2 reports BSSID 2 of WLAN AP2 to the base station through a neighbor cell report message. Subsequently, the base station determines whether or not user equipment 1 and user equipment 2, which have reported the BSSID of the WLAN AP to the base station, are currently communicating with one another and also determines whether or not the WLAN APs each having BSSID 1 and BSSID 2, which are respectively reported by user equipment 1 and user equipment 2, correspond to WLAN APs that are quickly connected to one another through a dedicated network. At this point, in case the WLAN APs each having BSSID 1 and BSSID 2, which are respectively reported by user equipment 1 and user equipment 2, are not quickly connected to one another through a dedicated network, user equipment 1 and user equipment 2 may each maintain their current status and transceive (transmit/receive) data to and from one another through the base station, as shown in (a) of FIG. 8.

Conversely, in case user equipment 1 and user equipment 2 are currently communicating with one another, and in case the WLAN APs each having BSSID 1 and BSSID 2, which are respectively reported by user equipment 1 and user equipment 2, are quickly connected to one another through a dedicated network, the base station, the WLAN AP, and each of the user equipments operate as shown in (b) of FIG. 8. Hereinafter, for simplicity in the description, a case when it is assumed that the WLAN APs each having BSSID 1 and BSSID 2, which are respectively reported by user equipment 1 and user equipment 2, are quickly connected to one another through a dedicated network, will be described.

(b) of FIG. 8 corresponds to a schematic view of a scenario of user equipments accessing a base station and performing communication with one another for receiving a request for switching (or shifting) the communication method by the base station or by a mobile communication core network having the base station accessing thereto and for performing communication by using a WLAN communication method through a specific WLAN AP (WLAN AP 1 and WLAN AP 2).

2-1, 2-2) Since user equipment 1 and user equipment 2, which have reported the BSSID of the WLAN AP to the base station are currently communicating with one another, and since WLAN APs each having the reported BSSID 1 and BSSID 2 are connected to one another through a dedicated network, the base station transmits an offloading request message to user equipment 1 and user equipment 2 and inquires whether or not user equipment 1 and user equipment 2 will perform communication by using a local transmission method through each WLAN AP, which can be respectively accessed by user equipment 1 and user equipment 2. As a response to this inquiry, each of user equipment 1 and user equipment 2 transmits an offloading response message to the base station, so as to notify the base station whether or not user equipment 1 and user equipment 2 will accept the local offloading request of the base station. At this point, if at least any one of user equipment 1 and user equipment 2 rejects (or refuses) the local offloading request, user equipment 1 and user equipment 2 may each maintain their current status and transceive (transmit/receive) data to and from one another through the base station, as shown in (a) of FIG. 8. Hereinafter, for simplicity in the description, a case when it is assumed that user equipment 1 and user equipment 2 have both accepted the local offloading request will be described.

3) After receiving the local offloading response message indicating the local offloading acceptance from user equipment 1 and user equipment 2, the base station transmits a local offloading indication message to the corresponding WLAN AP (WLAN AP1 and WLAN AP 2), so as to indicate that, when each of user equipment 1 and user equipment 2 accesses the corresponding WLAN AP, the WLAN APs will process data traffic of user equipment 1 and user equipment 2 by using the local transmission method. Herein, unlike the method when there is only one WLAN AP, when multiple WLAN APs are related to the local transmission, the BSSID of all WLAN APs that are related to the local transmission may be included in the local offloading indication message. Additionally, as described above, the local transmission method refers to a method, wherein, when the user equipment accessing any one of the WLAN APs transmits data to the corresponding WLAN AP, data may be delivered to a counterpart user equipment by performing transmission to a WLAN AP, to which the counterpart user equipment is accessing, through a dedicated network that is connected to the WLAN AP having the counterpart user equipment accessed thereto, without passing through a broadband network, which is used by a WLAN AP for accessing an internet network.

As a response to the local offloading indication message, the WLAN AP transmits a local offloading confirmation message, so as to notify the base station whether or not the corresponding local offloading request is accepted. At this point, in case any one of the corresponding WLAN APs (WLAN AP1 and WLAN AP 2) has rejected the local offloading request, user equipment 1 and user equipment 2 may each maintain their current status and transceive (transmit/receive) data to and from one another through the base station, as shown in (a) of FIG. 8. Hereinafter, for simplicity in the description, a case when it is assumed that both of the corresponding WLAN APs have accepted the local offloading request will be described.

4) After receiving all local offloading confirmation messages accepting local offloading from the corresponding WLAN APs, the base station transmits a local offloading command message to user equipment 1 and user equipment 2, thereby ordering (or commanding) user equipment 1 and user equipment 2 to perform data transmission through the WLAN APs each having the BSSID respectively reported by user equipment 1 and user equipment 2. Thereafter, after receiving the local offloading command message, each of user equipment 1 and user equipment 2 respectively accesses the corresponding WLAN AP, thereby transceiving (transmitting/receiving) communication traffic between user equipment 1 and user equipment 2 by using a WLAN communication method.

Figure 9:
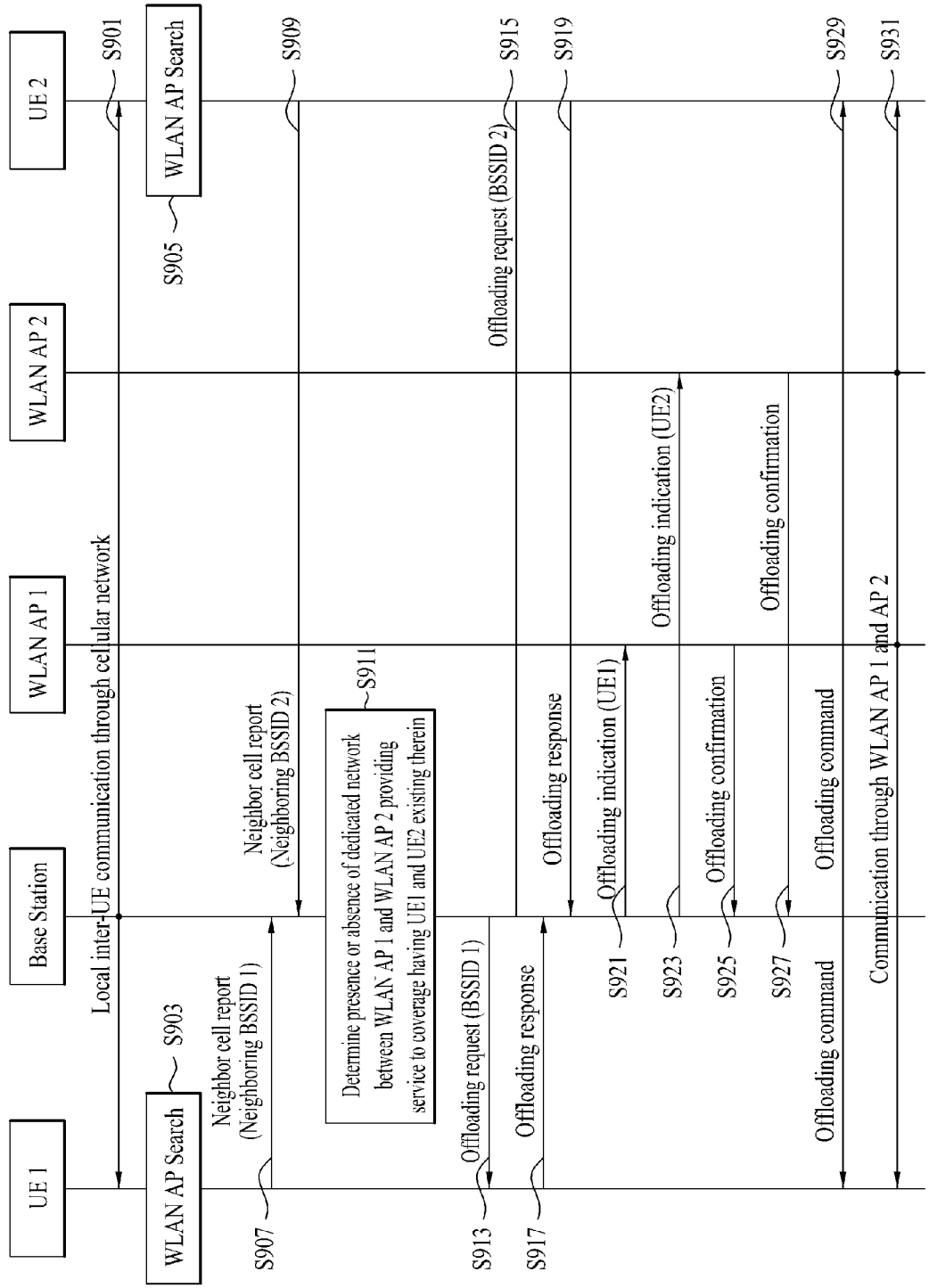
FIG. 9 illustrates an exemplary procedure of local traffic offloading according to an exemplary embodiment of the present invention.

FIG. 9 illustrates an exemplary procedure of local traffic offloading according to an exemplary embodiment of the present invention.

Referring to FIG. 9, while user equipment 1 (UE 1) and user equipment 2 (UE 2), which are located within a transmission range (coverage) of a specific mobile communication base station, are accessing a cellular network through the base station and are performing communication between one another (S901), user equipment 1 and user equipment 2 periodically search whether or not a neighboring WLAN AP, which is available for communication, exists (S903, S905). Herein, the method of each user equipment for searching for the corresponding WLAN AP may be performed by searching for a beacon frame, which is periodically transmitted by the WLAN AP, and by receiving the beacon frame.

As described above, the beacon frame may include information, such as time stamp, beacon interval, AP capability, SSID (Service Set Identifier), and supported rates, and so on. The SSID (Service Set Identifier) corresponds to an identifier that is used for identifying multiple basic service sets each being different from one another in a WLAN system, and the SSID may also be referred to as a basic service set identifier (BSSID).

After searching the WLAN AP, user equipment 1 and user equipment 2 transmit an ID (identifier) of the searched WLAN AP to the base station through a neighbor cell report message (S907, S909). More specifically, after receiving the beacon frame from the WLAN AP, among the information within the received beacon frame, user equipment 1 and user equipment 2 may transmit the BSSID of the WLAN AP, which has transmitted the corresponding beacon frame, to the base station through the neighbor cell report message. In case of FIG. 9, user equipment 1 transmits BSSID 1 of WLAN AP1 to the base station through a neighbor cell report message, and user equipment 2 transmits BSSID 2 of WLAN AP2 to the base station through a neighbor cell report message.

The neighbor cell report message may include identifier information of one or more WLAN APs. Additionally, the neighbor cell report message may also optionally include AP capability information, supported rate information, and so on, which are included in the beacon frame. Moreover, the neighbor cell report message may be included in a neighbor base station report message of a conventional cellular network, which is included in the base station, and may then be transmitted, and the neighbor cell report message may also be transmitted separately from the neighbor base station report message of the conventional cellular network. Herein, in case the neighbor cell report message is transmitted separately from the neighbor base station report message of the conventional cellular network, the neighbor cell report message may be configured to have the same format as the neighbor base station report message of the conventional cellular network. Furthermore, in order to be differentiated from the neighbor base station report message of the conventional cellular network, indication information may be included in the message.

Meanwhile, as described in steps S903, S905, since user equipment 1 and user equipment 2 periodically search for neighboring WLAN APs, user equipment 1 and user equipment 2 may periodically transmit a neighbor cell report message including the identification information respective to the searched WLAN AP to the base station. Additionally, the neighbor cell report message may also be transmitted to the base station only when the searched neighbor WLAN AP is changed due to a change in the mobility or channel status of the user equipment.

After receiving a neighbor cell report message from the currently accessed user equipments, the base station verifies the BSSID of the WLAN AP, and may verify whether or not communication is currently being performed between the user equipments that have reported the BSSID, whether or not the corresponding user equipments exist within the same WLAN AP coverage, and whether or not a dedicated network between WLAN APs having the BSSIDs reported by the user equipments exists (S911). In case of FIG. 9, the base station verifies whether or not WLAN AP 1 and WLAN AP 2 respectively reported by user equipment 1 and user equipment 2, which are currently accessing the base station and performing communication with one another, are connected to one another by a dedicated network.

Among the user equipments having transmitted the neighbor cell report message, the base station, in case the user equipments are currently communicating with one another, and in case WLAN APs reported by the user equipments are connected to one another by a dedicated network, the base station transmits an offloading request message for verifying whether or not local transmission is to be performed to the corresponding user equipments through the WLAN (S913, S915). In case of FIG. 9, it is assumed that user equipment 1 and user equipment 2, which are currently accessing the base station, perform communication with one another, and that the WLAN AP 1 and WLAN AP 2 respectively reported by user equipment 1 and user equipment 2 are connected to one another by a dedicated network. More specifically, the base station transmits an offloading request message to user equipment 1 and user equipment 2. Herein, as shown in FIG. 9, each of step S913 and step S915 may also be transmitted at different time points, and the time points at which step S913 and step S915 are performed may be interchanged. Additionally, step S913 and step S915 may also be performed by the base station at the same time point.

The offloading request message may include at least one of BSSID information of the WLAN AP to which user equipment receiving the corresponding message are to access in order to perform local transmission, identifier information of user equipments becoming targets of the local transmission, and local offloading flag/indicator indicating that the corresponding transmission is being performed by using the local transmission method through the WLAN AP.

After receiving the offloading request message from the base station, the user equipments (user equipment 1 and user equipment 2) decide whether or not to shift (or switch) to a communication method via WLAN so as to perform local transmission, based upon available QoS (Quality of Service) for the corresponding local transmission and/or based upon the amount of power required for transceiving traffic through the corresponding WLAN, and the user equipments include the decided information in the offloading response message and transmits the message to the base station (S917, S919). For example, generally, since a power consumption may become larger when performing communication through WLAN, as compared to when performing communication through a cellular network, the user equipment may decide whether or not to shift the communication method to WLAN by comparing the amount of power currently held (or reserved) by user equipment with a pre-decided threshold value. Additionally, after receiving the offloading request message from the base station, the user equipment may compare inter-base station or inter-WLAN channel status (or channel status between base stations or between WLANs, level of interference, and so on, with a pre-decided threshold value, so as to decide whether or not to shift the communication method to WLAN, and, moreover, the user equipment may relatively compare the channel status, level of interference, and so on, between the user equipment and the base station with the channel status, level of interference, and so on, between the user equipment and the WLAN, so as to decide whether or not to shift the communication method to WLAN.

The offloading response message may include indication information indicating whether or not to have the user equipment perform shifting (or switching) of the communication method to WLAN.

After receiving the offloading response message from the user equipments, in case all of the corresponding user equipments (user equipment 1 and user equipment 2) have decided to perform local transmission, the base station transmits a local offloading indication message to the WLAN AP having the BSSID, which is reported by the corresponding user equipments (S921, S923). More specifically, the base station may transmit a local offloading indication message to WLAN APs each having the BSSID, which is included in the offloading request message. Herein, as shown in FIG. 9, each of step S921 and step S923 may also be transmitted at different time points, and the time points at which step S921 and step S923 are performed may be interchanged. Additionally, step S921 and step S923 may also be performed by the base station at the same time point.

The local offloading indication message may include identifiers of user equipments, which are to perform communication through the corresponding WLAN AP. Herein, a MAC address of the user equipment may be used as an example of the identifier of the user equipment. Additionally, unlike in the case when there is only one WLAN AP, when multiple WLAN APs are related to the local transmission, the BSSID of all WLAN APs that are to be related to the local transmission of the corresponding user equipments may be included in the local offloading indication message.

At this point, as described above, the base station and the WLAN APs may be connected to one another in a state available for communication through a specific network, and the WLAN APs may be controlled by the corresponding base station or by a mobile communication core network having the corresponding base station accessed thereto.

After receiving the local offloading indication message, the WLAN AP may optionally transmit a local offloading confirmation message to the base station (S925, S927). More specifically, step S925 and step S927 may also be omitted. As described above, in case step S925 and step S927 are omitted, after transmitting the local offloading indication message to the WLAN AP, the base station may perform step S929 immediately or after a predetermined period of time has elapsed.

The local offloading confirmation message may include indication information indicating an acceptance or rejection of the local offloading, which is requested by the base station.

Hereinafter, for simplicity in the description, a case when it is assumed that step S925 and step S927 are performed and that each of the WLAN APs has accepted the local offloading will be described.

After receiving the local offloading confirmation message from the WLAN APs, the base station transmits an offloading command message to the user equipments (user equipment 1 and user equipment 2), which are to perform local offloading (S929). Herein, the offloading command message may include the BSSID of the WLAN to which the user equipment are to access in order to perform local offloading. More specifically, BSSID 1 of WLAN AP 1 may be included in the offloading command message being transmitted to user equipment 1, and BSSID 2 of WLAN AP 2 may be included in the offloading command message being transmitted to user equipment 2.

After receiving the offloading command message, and after the access to the WLAN AP having the BSSID, which is included in the offloading command message, is established, the user equipment performs communication by using the local transmission method through the corresponding WLAN AP (S931). More specifically, WLAN AP 1 and WLAN AP 2, which have received the local offloading indication message from the base station in step S921 and step S923, are operated to allow inter-UE local transmission to be performed through a dedicated network interconnecting the user equipments to one another without having to pass through a broadband network, when the user equipments having the identifier, which is included in the local offloading indication message, perform access. At this point, the access procedure of each user equipment to the WLAN AP may follow the conventional WLAN access procedure, as shown in FIG. 4. Additionally, each of the user equipments accessing the corresponding WLAN AP may disconnect the cellular connection, to which the user equipments are currently accessing, or may shift to an idle state/mode, thereby being capable of minimizing power consumption of the user equipment.

Meanwhile, the above-described step S913 to step S919 may also be omitted. More specifically, among the user equipments having transmitted the neighbor cell report message, in case the user equipments are currently communicating with one another, and in case the WLAN AP having the BBSID, which is reported by each user equipment, is connected by a dedicated network, by transmitting a local offloading indication message to each WLAN AP, the base station may perform the remaining procedure starting from step S921 and step S923. Additionally, in case step S925 and step S927 are also omitted, after performing step S921 and step S923, by transmitting an offloading command message to each of the user equipments, the base station may perform the remaining procedure starting from step S929. At this point, the time point at which step S921 and step S923 are performed may be identical to the time point at which step S929 is performed.

3. General Description of a Device to which the Present Invention may be Applied FIG. 10 illustrates a block view of a structure of a wireless communication device according to an exemplary embodiment of the present invention.

Figure 10:
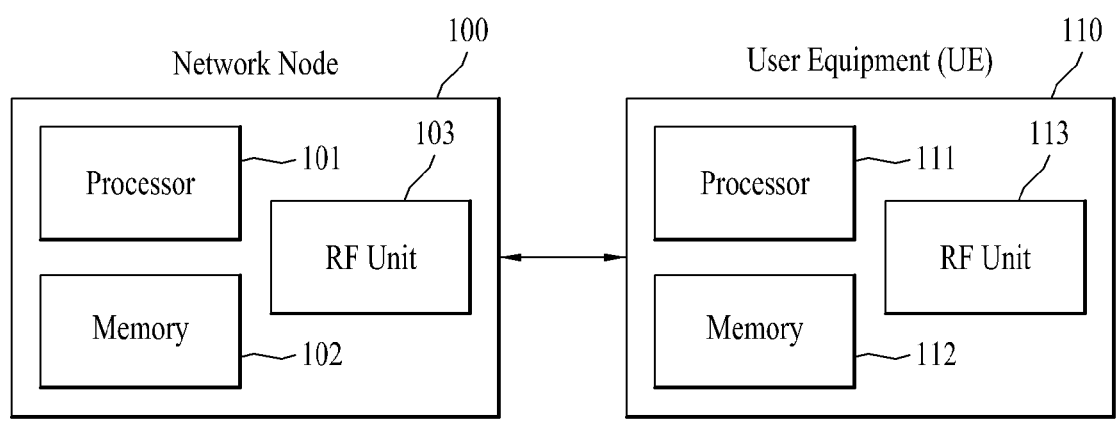
FIG. 10 illustrates a block view of a structure of a wireless communication device according to an exemplary embodiment of the present invention.

Referring to FIG. 10, a wireless communication device includes a network node (100) and multiple user equipments (110) located within the network node (100) area. Herein, in the above-described exemplary embodiment, the network node (100) may correspond to a base station or a WLAN AP.

The network node (100) includes a processor (101), a memory (102), and an RF unit (radio frequency unit) (103). The processor (101) realizes the proposed functions, procedures, and/or methods. Layer of the wireless interface protocol may be realized by the processor (101). The memory (102) is connected to the processor (101) and stores diverse information for operating the processor (101). The RF unit (103) is connected to the processor (101) and transmits and/or receives radio signals.

The user equipment (110) includes a processor (111), a memory (112), and an RF module (113). The processor (111) realizes the proposed functions, procedures, and/or methods. Layer of the wireless interface protocol may be realized by the processor (111). The memory (112) is connected to the processor (111) and stores diverse information for operating the processor (111). The RF unit (113) is connected to the processor (111) and transmits and/or receives radio signals.

The memory (102, 112) may be provided inside or outside of the processor (101, 111) and may be connected to the processor (101, 111) through diverse well-known means. Furthermore, the network node (100) and/or the user equipment (110) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although a method for transmitting data in a wireless communication system of the present invention is described based upon an example that can be applied to a 3GPP LTE system and an IEEE 802.11 system, the method of the present invention may also be applied to a variety of other radio access system in addition to the 3GPP LTE system and the IEEE 802.11 system.

What is claimed is:

1. A method of offloading data from a cellular network to a WLAN (Wireless Local Area Network) in a wireless communication system supporting multi Radio Access Network, the method performed by a base station and comprising:
receiving, from a first user equipment, a first neighboring cell report message including a first WLAN (Wireless Local Area Network) AP (Access Point) identifier searched by the first user equipment in a coverage of a corresponding WLAN AP;
receiving, from a second user equipment, a second neighboring cell report message including a second WLAN AP identifier searched by the second user equipment in a coverage of a corresponding WLAN AP,
wherein the first user equipment and the second user equipment communicate with one another without being connected to the WLAN;
checking if the first WLAN AP identifier is identical to the second WLAN AP identifier;
when the first WLAN AP identifier is identical to the second WLAN AP identifier, transmitting, to a specific WLAN AP indicated by the first and the second WLAN identifiers, an offloading indication message indicating the specific WLAN AP is to process data traffic between the first user equipment and the second user equipment via a local transmission method; and
transmitting, to the first user equipment and the second user equipment, an offloading command message commanding the first user equipment and the second user equipment to communicate with one another via the local transmission method through the specific WLAN AP.

2. The method of claim 1, wherein the local transmission method for processing the data traffic of the first user equipment and the second user equipment is performed only through the specific WLAN AP without having to pass through a broadband network.

3. The method of claim 1, further comprising:
transmitting, to the first user equipment and the second user equipment, an offload request message verifying whether or not to perform data transmission and reception through the specific WLAN AP; and receiving, from the first user equipment and the second user equipment, an offloading response message indicating whether or not the data transmission and reception through the specific WLAN AP has been accepted.

4. The method of claim 3, wherein whether or not the data transmission and reception through the specific WLAN AP has been accepted is decided based upon at least any one of a QoS (Quality of Service) available when data are transmitted and received through the specific WLAN AP and an amount of power required for transmitting and receiving data through the specific WLAN AP.

5. The method of claim 1, further comprising:
receiving, from the specific WLAN AP, an offloading confirmation message indicating whether or not offloading of data of the first user equipment and the second user equipment has been accepted.

6. The method of claim 3, wherein the offloading request message includes at least any one of an identifier of the specific WLAN AP, identifiers of the first user equipment and the second user equipment, and an indicator indicating data transmission through the specific WLAN AP.

7. The method of claim 1, wherein the offloading indication message includes a MAC (Medium Access Control) address of the first user equipment and the second user equipment.

8. A base station configured to offload data from a cellular network to a WLAN (Wireless Local Area Network) in a wireless communication system supporting multi Radio Access Network, the base station comprising:
an RF (Radio Frequency) unit configured to transmit and receive a radio signal; and
a processor configured to:
receive, from a first user equipment, a first neighboring cell report message including a first WLAN (Wireless Local Area Network) AP (Access Point) identifier, searched by the first user equipment in a coverage of a corresponding WLAN AP,
receive, from a second user equipment, a second neighboring cell report message including a second WLAN AP identifier searched by the second user equipment in a coverage of a corresponding WLAN AP,
wherein the first user equipment and the second user equipment communicate with one another without being connected to the WLAN,
check if the first WLAN AP identifier is identical to the second WLAN AP identifier,
transmit, to a specific WLAN AP indicated by the first and the second WLAN identifiers, an offloading indication message indicating the specific WLAN AP is to process data traffic between the first user equipment and the second user equipment via a local transmission method, when the first WLAN AP identifier is identical to the second WLAN AP identifier, and
transmit, to the first user equipment and the second user equipment, an offloading command message commanding the first user equipment and the second user equipment to communicate with one another via the local transmission method through the specific WLAN AP.

9. The base station of claim 8, wherein the local transmission method for processing the data traffic of the first user equipment and the second user equipment is performed only through the specific WLAN AP without having to pass through a broadband network.

10. The base station of claim 8,
wherein the processor transmits, to the first user equipment and the second user equipment, an offload request message verifying whether or not to perform data transmission and reception through the specific WLAN AP, and
wherein the processor receives, from the first user equipment and the second user equipment, an offloading response message indicating whether or not the data transmission and reception through the specific WLAN AP has been accepted.

11. The base station of claim 10, wherein whether or not the data transmission and reception through the specific WLAN AP has been accepted is decided based upon at least any one of a QoS (Quality of Service) available when data are transmitted and received through the specific WLAN AP and an amount of power required for transmitting and receiving data through the specific WLAN AP.

12. The base station of claim 8, wherein the processor receives, from the specific WLAN AP, an offloading confirmation message indicating whether or not offloading of data of the first user equipment and the second user equipment has been accepted.

13. The base station of claim 8, wherein the offloading request message includes at least any one of an identifier of the specific WLAN AP, identifiers of the first user equipment and the second user equipment, and an indicator indicating data transmission through the specific WLAN AP.

14. The base station of claim 8, wherein the offloading indication message includes a MAC (Medium Access Control) address of the first user equipment and the second user equipment.

15. A method of offloading data from a cellular network to a WLAN (Wireless Local Area Network), in a wireless communication system supporting multi Radio Access Network, the method performed by a base station and comprising:
receiving, from a first user equipment, a first neighboring cell report message including a first WLAN (Wireless Local Area Network) AP (Access Point) identifier searched by the first user equipment in a coverage of a corresponding WLAN AP;
receiving, from a second user equipment, a second neighboring cell report message including a second WLAN AP identifier searched by the second user equipment in a coverage of a corresponding WLAN AP,
wherein the first user equipment and the second user equipment communicate with one another without being connected to the WLAN;
checking if a first WLAN AP having the first WLAN AP identifier and a second WLAN AP having the second WLAN AP identifier are connected to one another by a dedicated network;
when the first WLAN AP and the second WLAN AP are connected to one another by the dedicated network, transmitting, to the first and second WLAN AP, an offloading indication message indicating the first and second WLAN AP are to process data traffic between the first user equipment and the second user equipment via a local transmission method; and
transmitting, to the first user equipment and the second user equipment, an offloading command message commanding the first user equipment and the second user equipment to communicate with one another via the local transmission method through the first and second WLAN AP.

16. As a base station configured to offload data from a cellular network to a WLAN (Wireless Local Area Network) in a wireless communication system supporting multi Radio Access Network, the base station comprising:
an RF (Radio Frequency) unit configured to transmit and receive a radio signal; and a processor configured to:
  receive, from a first user equipment, a first neighboring cell report message including a first WLAN (Wireless Local Area Network) AP (Access Point) identifier, searched by the first user equipment in a coverage of a corresponding WLAN AP,
  receive, from a second user equipment, a second neighboring cell report message including a second WLAN AP identifier searched by the second user equipment in a coverage of a corresponding WLAN AP,
  wherein the first user equipment and the second user equipment communicate with one another without being connected to the WLAN,
  check if a first WLAN AP having the first WLAN AP identifier and a second WLAN AP having the second WLAN AP identifier are connected to one another by a dedicated network,
  transmit, to the first and second WLAN AP, an offloading indication message indicating the first and second WLAN AP are to process data traffic between the first user equipment and the second user equipment via a local transmission method, when the first WLAN AP and the second WLAN AP are connected to one another by the dedicated network, and
  transmit, to the first user equipment and the second user equipment, an offloading command message commanding the first user equipment and the second user equipment to communicate with one another via the local transmission method through the first and second WLAN AP.

* * * * *